United States Patent
Imhof et al.

(10) Patent No.: US 7,164,972 B2
(45) Date of Patent: Jan. 16, 2007

(54) METHOD AND APPARATUS FOR REPRESENTING A BUILDING SYSTEM

(75) Inventors: Raphael Imhof, Arlington Heights, IL (US); Thomas Rule, Arlington Heights, IL (US); Osman Ahmed, Hawthorn Woods, IL (US); Pornsak Songkakul, Mequon, WI (US); George Phoenix, Buffalo Grove, IL (US)

(73) Assignee: Siemens Building Technologies, Inc., Buffalo grove, IL (US)

(*) Notice: Subject to any disclaimer, the term of this patent is extended or adjusted under 35 U.S.C. 154(b) by 31 days.

(21) Appl. No.: 11/169,282

(22) Filed: Jun. 28, 2005

(65) Prior Publication Data
US 2005/0289467 A1 Dec. 29, 2005

Related U.S. Application Data

(60) Provisional application No. 60/583,585, filed on Jun. 28, 2004, provisional application No. 60/583,572, filed on Jun. 28, 2004, provisional application No. 60/583,519, filed on Jun. 28, 2004.

(51) Int. Cl.
   *G06F 19/00* (2006.01)
(52) U.S. Cl. .......... 700/276; 700/17; 700/20; 700/83; 700/86; 707/104.1; 715/734; 715/804; 717/108; 340/524; 340/310.11
(58) Field of Classification Search ............. 700/17, 700/19, 20, 28, 83, 86, 275, 276; 707/104.1; 715/734, 804; 717/108; 340/310.11, 524
See application file for complete search history.

(56) References Cited

U.S. PATENT DOCUMENTS

| | | | |
|---|---|---|---|
| 5,611,059 A | 3/1997 | Benton et al. | 715/734 |
| 5,706,455 A | 1/1998 | Benton et al. | 715/853 |
| 5,937,410 A | 8/1999 | Shen | 707/103 R |
| 6,028,998 A * | 2/2000 | Gloudeman et al. | 717/108 |
| 6,104,963 A * | 8/2000 | Cebasek et al. | 700/86 |
| 6,119,125 A * | 9/2000 | Gloudeman et al. | 707/103 R |
| 6,141,595 A | 10/2000 | Gloudeman et al. | 700/83 |
| 6,154,681 A | 11/2000 | Drees et al. | 700/19 |
| 6,167,316 A | 12/2000 | Gloudeman et al. | 700/2 |
| 6,240,326 B1 * | 5/2001 | Gloudeman et al. | 700/83 |
| 6,487,457 B1 | 11/2002 | Hull et al. | 700/17 |
| 6,967,565 B1 * | 11/2005 | Lingemann | 340/310.11 |
| 2005/0275525 A1 * | 12/2005 | Ahmed | 340/524 |

* cited by examiner

*Primary Examiner*—Leo Picard
*Assistant Examiner*—Douglas S. Lee

(57) ABSTRACT

An arrangement for coordinating data representative of a building system includes a process connected to a memory. The memory stores a plurality of building space objects and at least one building automation device object. At least one building space object includes a reference to at least one of the group consisting of a parent building space object and a child building space object, a reference to at least one graphic file containing a graphic image representation of the building space, and a reference to information regarding one or more building automation devices associated with the building space object. At least one building automation device object includes a reference to a corresponding building space object, a reference to at least one operating value of the building automation device, and a reference to a link to a file containing information regarding the at least one building automation device object.

19 Claims, 8 Drawing Sheets

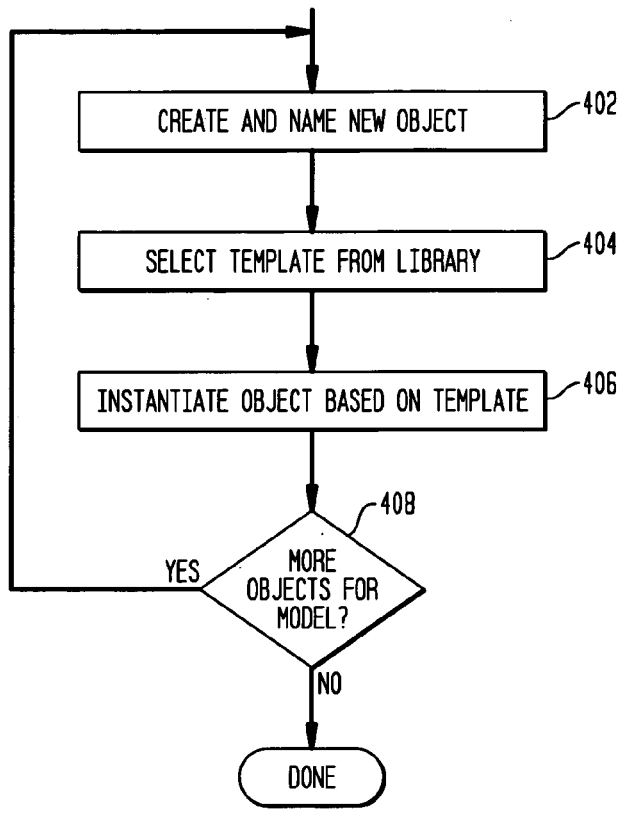

FIG. 6

| ID | TYPE | [CHILD] | [PARENT] | [GRAPHIC] | [SENSOR VALUES] | [SQ. FT] [VOLUME] | [LOCATION] | [PROGRAMMING INSTRUCTION] | ... |
|---|---|---|---|---|---|---|---|---|---|
| | | [ARCHITECTURAL SENSOR ACTUATOR] | [ARCHITECTURAL AIR SUPPLY AIR EXHAUST] ... | | | | | | |

FIG. 6A

| 302 | ROOM | [302a 326 0 ...] | [301 320 380] | 102_GRAPHIC | 126T | 110, 1014 | 472, 318 | 0 | ... |
|---|---|---|---|---|---|---|---|---|---|

FIG. 6B

| 304 | ROOM | [0 328 0 ...] | [301 322 ...] | 104_GRAPHIC | 128T | 110, 1010 | 472, 328 | 0 | ... |
|---|---|---|---|---|---|---|---|---|---|

FIG. 7

| ID | TYPE | [CHILD] | [PARENT] | [GRAPHIC] | [SENSOR VALUES] | [X-SECTION AREA] | [LENGTH] | [LOCATION] | [PROGRAMMING INSTRUCTION] |
|---|---|---|---|---|---|---|---|---|---|
| 704 | 706 / 712 | 714 | 716 | 718 | 720 | 722 | 726 | 728 | |
|  |  | [ARCHITECTURAL ACTUATOR MR. ...] | [ARCHITECTURAL ...] |  |  |  |  |  | ... |

| 704 | 706 / INLET/VAU | 712 | 714 | 716 | 718 | 720 | 722 | 726 | 728 |
|---|---|---|---|---|---|---|---|---|---|
| 320 |  | [302, 314, 336, 0 ...] | [304 ...] | 0 | 0 | 44 | 12 | 480, 321 | 0 ... |

FIG. 7B

| 704 | 706 / INLET/VAU | 712 | 714 | 716 | 718 | 720 | 722 | 726 | 728 |
|---|---|---|---|---|---|---|---|---|---|
| 322 |  | [304, 316, 338, 0] | [324 ...] | 0 | 0 | 48 | 12 | 480, 331 | 0 ... |

FIG. 9

| ID | TYPE | | | | | | |
|---|---|---|---|---|---|---|---|
| 904 | 906→ | 912 | 914 | 916 | 918 | 920 | 922 924 926 |
| | ARCHITECTURAL CONTROLLER ... | | | | | | |
| | [PARENT] | [VENDOR] | [CHARACTERISTICS] | [MODEL] | [POINT ID] | [PROGRAMMING INSTRUCTION] | [HISTORICAL MAINTENANCE] [CALIBRATION DATA] ... |

| 312 | DAMPER | | | | | | |
|---|---|---|---|---|---|---|---|
| | [324 408 ...] | DAMPER | 774B_GRAPH | 774B | 112C | DIAGNOSTIC CAL PROGRAM | 312_HIST  312_CAL DATA |

FIG. 9B

| 314 | DAMPER | | | | | | |
|---|---|---|---|---|---|---|---|
| | [320 406 ...] | DAMPER | 172D_GRAPH | 172D | 114C | DIAGNOSTIC CAL PROGRAM | 314_HIST  314_CAL DATA |

…

METHOD AND APPARATUS FOR REPRESENTING A BUILDING SYSTEM

This application claims the benefit of U.S. Provisional Patent Application Ser. Nos. 60/583,519, 60/583,572, and 60/583,585, each filed Jun. 28, 2004, all of which are incorporated herein by reference.

CROSS REFERENCE TO RELATED APPLICATIONS

Cross reference is made to related patent application Ser. No. 11/169,278, filed Jun. 28, 2005, which is incorporated herein by reference.

FIELD OF THE INVENTION

The present invention relates generally to building automation systems, and more particularly, to methods and apparatus for representing and/or storing building automation system data.

BACKGROUND OF THE INVENTION

Building automation systems are comprehensive and distributed control and data collection systems for a variety of building automation functions. Such functions may include comfort systems (also known as heating, ventilation and air condition or HVAC systems), security systems, fire safety systems, as well as others. Building automation systems include various end points from which data is collected. Examples of such end points include temperature sensors, smoke sensors, and light sensors. Building automation systems further include elements that may be controlled, for example, heating coil valves, ventilation dampers, and sprinkler systems. Between the data collection end points and controlled elements are various control logic elements or processors that use the collected data to control the various elements to carry out the ends of providing a comfortable, safe and efficient building.

Building automation systems often employ one or more data networks to facilitate data communication between the various elements. These networks may include local area networks, wide area networks, and the like. Such networks allow for single point user access to many variables in the system, including collected end point data as well as command values for controlling elements. To this end, a supervisory computer having a graphical user interface is connected to one of the networks. The supervisory computer can then obtain selected data from elements on the system and provide commands to selected elements of the system. The graphical display allows for an intuitive representation of the elements of the system, thereby facilitating comprehension of system data. One commercially available building automation system that incorporates the above described elements is the Apogee system available from Siemens Building Technologies, Inc. of Buffalo Grove, Ill.

Increasingly, building automation systems have acquired more useful features to assist in the smooth operation of building systems. For example, in addition to controlling physical devices based on sensor readings to achieve a particular result, building automation systems increasingly are capable of providing trending data from sensors, alarm indications when thresholds are crossed, and other elements that directly or indirectly contribute to improved building system services.

However, most building systems have limited ability to associate sensor values with other building system or general building attributes. Advanced systems allow graphic representations of portions of the building to be generated, and for multiple sensor and/or actuator points to be associated with that graphic representation. By way of example, the Insight™ Workstation, also available from Siemens Building Technologies, Inc. is capable of complex graphical representations of rooms or large devices of the building system. While systems with such graphics provide at least some integrated visible representation of portions of the building automation system, the ability to use such data is limited.

Accordingly, there is a need for a more comprehensive manner in representing various types of data related to a building system. Such manner of representation could facilitate the development of significant new automated services. Such manner of representation could preferably facilitate remote building control.

SUMMARY OF THE INVENTION

The present invention provides an improved building system model and method for generating the same. The model is a data mode that links information regarding building topology and building automation devices, among other things. The model facilitates a large set of extended services.

A first embodiment of the invention is a model of a building system that is stored in a memory. The model comprises a plurality of building space objects and at least one building automation device object. At least one building space object includes a reference to at least one of the group consisting of a parent building space object and a child building space object, a reference to at least one graphic file containing a graphic image representation of the building space, and a reference to information regarding one or more building automation devices associated with the building space object. Each building automation device object includes a reference to a corresponding building space object, and a reference to at least one operating value of the building automation device. Optionally building automation device objects may further include a reference to a link to a file containing information regarding the at least one building automation device object.

A second embodiment is a method of generating a model of a building system that includes a step of selecting an object template for an element of a building system from an object template library, the object template library including building space object templates and building automation device objects. The method also includes instantiating first information into at least one building space object using the selected object template if the selected object template is a building space object template. In such a case, the first information comprises information associated with the space within a building with which the building system is associated. Another step includes instantiating second information into at least one building automation device object using the selected object template if the selected object template is a building automation device template. The second information in such a case is information associated with a building automation device within the building. The second information includes at least a reference to a building space object corresponding to a building space associated with the building automation device.

Each of the above embodiments links building automation device information to a building structure or space information, and the building structure or space information is preferably arranged in a hierarchical manner. The resulting model of these embodiments thus provides a useful representation of a building system.

The above described features and advantages, as well as others, will become more readily apparent to those of ordinary skill in the art by reference to the following detailed description and accompanying drawings.

BRIEF DESCRIPTION OF THE DRAWINGS

FIG. 4 shows a flow diagram of an exemplary set of operations performed to generate a model in accordance with aspects of the invention;

FIG. 5 shows a block diagram of an exemplary building zone template for use in generating building zone objects in a model according to an embodiment of the invention;

FIG. 5a shows a block diagram of a building zone object of the model of FIG. 4 generated from the building zone template of FIG. 5;

FIG. 6 shows a block diagram of an exemplary room space template for use in generating room space objects in a model according to an embodiment of the invention;

FIGS. 6a and 6b shows a block diagram of room space objects of the model of FIG. 4 generated from the room space template of FIG. 6;

FIG. 7 shows a block diagram of an exemplary inlet shaft segment template for use in generating inlet shaft segment objects in a model according to an embodiment of the invention;

FIGS. 7a and 7b show block diagrams of inlet shaft segment objects of the model of FIG. 4 generated from the inlet shaft segment template of FIG. 7;

FIG. 9 shows a block diagram of an exemplary damper template for use in generating damper objects in a model according to an embodiment of the invention; and FIGS. 9a, 9b show block diagrams of damper objects of the model of FIG. 4 generated from the damper template of FIG. 9.

DETAILED DESCRIPTION

Figure 1:
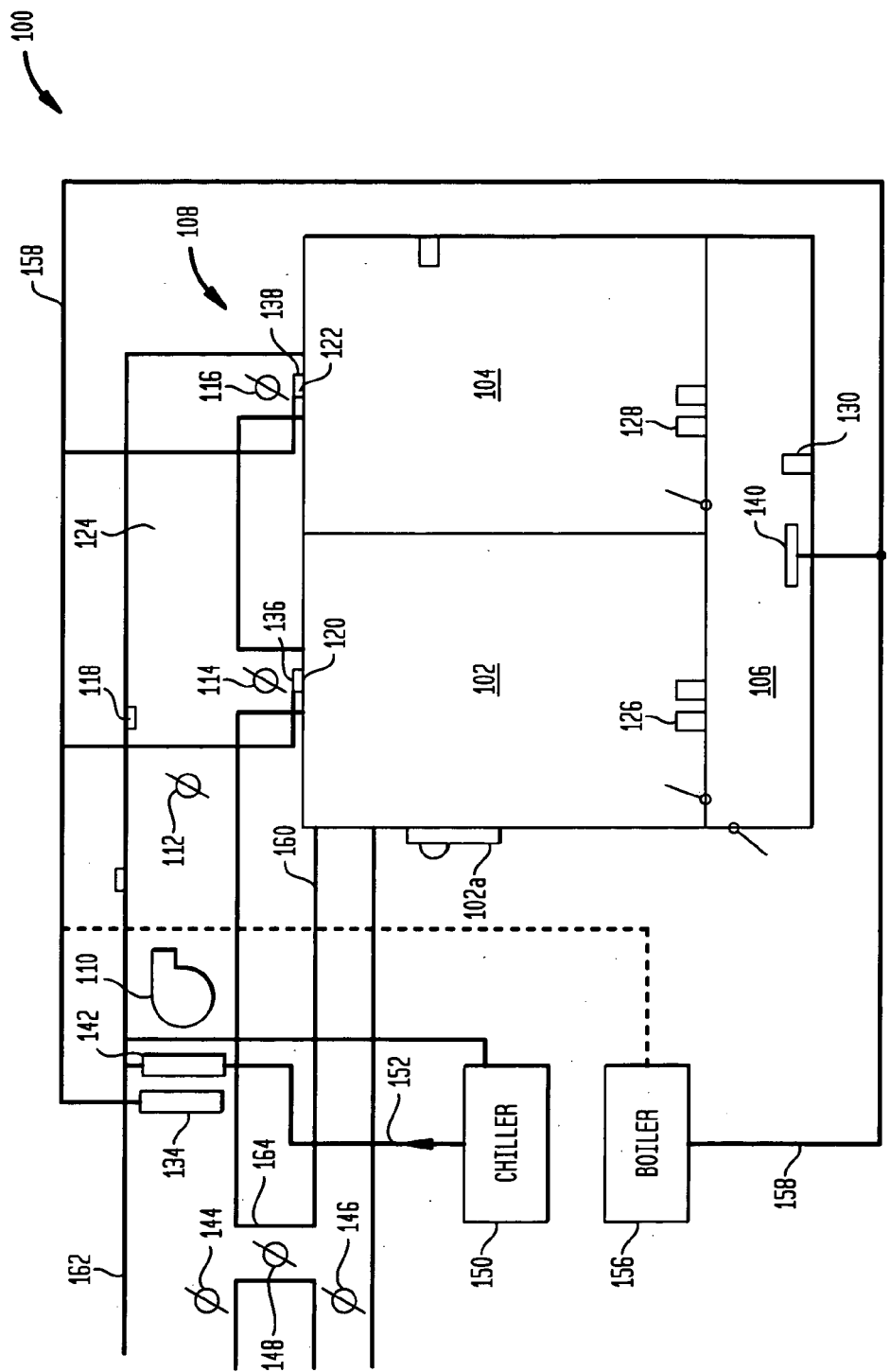
FIG. 1 shows a mechanical top view floor plan diagram of a building space wherein various HVAC elements are schematically represented.

FIG. 1 shows a top view of a building zone 100 that includes a number of building automation devices that form a portion of the heating, ventilation and air conditioning ("HVAC") for the building system. The building zone 100 includes a first room space 102, a first window 102a, a second room space 104, a hall space 106 and mechanical space 108. The mechanical space 108 is illustrated as being adjacent to the room spaces 102 and 104 for clarity of exposition, but in actuality would also typically extend over the top of the first room space 102, the second room space 104, and the hall space 106.

The portion of the HVAC system shown in FIG. 1 includes an air handling unit ("AHU") 110, a shaft damper 112, a first room damper 114, a second room damper 116, a flow sensor 118, a first room inlet 120, a second room inlet 122, a shaft branch 124, a first temperature sensor 126, a second temperature sensor 128, and a space temperature adjuster 130. The portion of the HVAC system further includes hot water exchangers or coils 134, 136, 138 and 140, a chilled water exchanger or coil 142, a fresh air damper 144, an exhaust damper 146 and a mixing damper 148. The HVAC system also includes a chiller 150 and associated distribution pipes 152, and a boiler 154 and associated hot water distribution pipes 156.

Also shown in FIG. 1 is a security sensor 132 that may be a portion of a security system in the building zone 100. The HVAC system has further control elements and networks that are not illustrated in FIG. 1, but are represented schematically in FIG. 2, which is discussed further below. FIG. 1 primarily shows only the mechanical devices in the HVAC system.

In general, the HVAC system is designed to, among other things, regulate temperature in the first room space 102 and the second room space 104. To this end, the HVAC system advances cool (or warm air) into the first and second room spaces 102, 104 as needed to maintain a desired temperature. The "desired temperature" may vary from room space to room space, or may be uniform through the building zone 100. The desired temperature is referred to herein as the set point temperature, and may be dictated by a local thermostat setting or from a central control device, as will be discussed in further detail below.

Referring to the structure of the HVAC system of FIG. 1, the AHU 110 is a mechanical device well known in the art that is configured to blow air through the shaft branch 124, as well as other similar shaft branches, not shown. The shaft branch 124 extends adjacent to the room spaces 102 and 104. The first room inlet 120 extends from a portion of the shaft branch 124 toward the first room space 102 and is in fluid communication with the first room space 102. The first room inlet 120 may suitably be a variable air volume or VAV box as is well known in the art. The room inlet 120 contains the first room damper 114 and the hot water coil or heating coil 136. The first room damper 114 operates to controllably meter the flow of air from the shaft branch 124 to the first room space 102. The heating coil 136 allows the air entering the first room space to be heated in the event that temperature of the room space 102 needs to be raised.

Similarly, the second room inlet 122 extends from another portion of the shaft branch 124 toward the second room space 104 and is in fluid communication with the second room space 104. The second room inlet 122 may also suitably be a VAV box known in the art, and in any event contains the second room damper 116 and the heating coild 138. The second room damper 116 and operates to controllably meter the flow of air from the shaft branch 124 to the second room space 104.

The shaft damper 112 is arranged in the shaft branch 124 to meter the overall air flow through the shaft branch 124.

To accomplish the regulation of air flow, each of the dampers 112, 114 and 116 is a mechanical device that is configured to controllably restrict the flow of air therethrough. Ventilation damper devices are well known in the art and may take many forms. Each damper 112, 114 and 116 has an actuator associated therewith, not shown in FIG. 1, which controls the opening and closing of the damper. As will be discussed below in connection with FIG. 2, the damper actuator is controlled by a control device to either further open or further close the damper in order to increase or decrease, respectively, the flow of air therethrough.

As shown in FIG. 1, the system also includes an air return or exhaust shaft 160, which is designed to receive exhaust air from the room 102. The shaft 160 may suitably also be in communication with the second room space 104, although not illustrated in FIG. 1 for purposes of clarity. The exhaust shaft 160 extends to the outside of the building or the like. A recirculation shaft 164 branches off the exhaust shaft 160 to draw off at least some exhaust air for recirculation. The recirculation shaft 164 extends to a fresh air inlet 162 for the AHU 110. An exhaust damper 146 disposed within the exhaust shaft 160 regulates the amount of exhaust air that is evacuated from the building, while the recirculation damper 148 regulates the amount of exhaust air that is mixed with fresh air and recirculated through the building via the AHU 110. The fresh air inlet 166 includes a damper 144 or similar device that regulates the amount of fresh air that is supplied to the AHU 110.

The dampers 144, 146 and 148 may suitably have a construction and operation similar to that described above in connection with the dampers 112, 114 and 116. The dampers 144, 146 and 148 preferably also have associated actuators which allow for automated control of the air flow through the dampers.

The air circulated through the shaft 124 and thus into the room spaces 102 and 104 my either be heated air or cooled air, depending on the season. To this end, the chiller plant 150 provides chilled water that is circulated to, among other things, the chilled water coil 142. The chilled water coil 142 is a device that absorbs heat to effect a transfer of cooling. In general, the chilled water coil 142 includes a series of conduits that allow for heat exchange between the surrounding air and coolant inside the conduits. The chilled water coil 142 also includes a valve that controls the flow of chilled water into the heat exchange conduits. Analogous to the ventilation dampers 112, 114 and 116, the chilled water coil 142 includes an associated actuator, not shown in FIG. 1, that allows for remote, automated control of the opening and closing of the valve.

The chilled water coil 142 is disposed adjacent the AHU 110 such that when the conduits are full of chilled water (or other coolant), the AHU 110 causes air to flow though the chilled water coil 142 such that the air is chilled. When the chilled water chilled 142 does not include chilled water (because the valve is closed), the air still flows through the exchanger 142, but is not chilled.

In a similar manner, the boiler plant 154 provides hot water or steam that is circulated to, among other things, several heat exchangers or heating coils 134, 136, 138 and 140. The heating coils 134, 136, 138 and 140 may suitably have a structure similar to the chilled water coil 142. Each heating coil 134, 136, 138 and 140 includes a valve and associated actuator to control the opening and closing of the valve. When the valve is closed, no additional hot water flows through the coil, and the surrounding air is not heated. When the valve is open, fresh hot water and/or stream is supplied to the coil, and the surrounding air is heated.

The heating coil 134 is positioned in the vicinity of the AHU 110. When the valve of the heating coil 134 is opened, the AHU 110 blows heated air through the shaft 124. As discussed above, the heating coils 136 and 138 are disposed at the room inlets 120 and 122, respectively. As air flows into the room spaces via the inlets 120 and 122 from the shaft 124, the heating coils 136 and 138 may controllably heat the air flow to allow for particularized air temperature control in the individual room spaces 102 and 104. The heating coil 140 in the hall space 106 may suitably include a baseboard heating element.

In order to determine whether more or less cold (or warm air) is needed to achieve or maintain a set point temperature, the controlling units of the HVAC system (see FIG. 2 discussed below) obtain measured or sensed temperatures from the temperature sensors 126 and 128. If the measured temperature at either sensor is higher than the set point temperature, then the HVAC system controlling units may cause additional cold air to be advanced into the corresponding room space 102 and/or 104 by further opening the dampers 112, 114 and/or 116. Likewise, if the measured temperature is lower than the set point temperature, then the HVAC system controlling units may cause reduced cold air flow into the room spaces 112, 114 and 116 by further closing the dampers 112, 114 and/or 116. In addition to merely controlling air flow, one or more of the various heating and chilled water coils 134, 136, 138, 140 and 142 may be controlled to increase or decrease the temperature as needed.

The chiller plant 150 may suitably be any cooling unit known in the art for use in performing chilling functions in a building or facility. The chiller plant 150 may suitably have various parameters that are also controllable via HVAC system controlling units, as is known in the art. The boiler plant 156 is similarly any suitable boiler known in the art or otherwise.

While the various heating and cooling needs may be controlled by increasing or decreasing the flow of heated or chilled air in the room spaces 102 and 104, sometimes merely varying the flow of the air in the shaft 124 is inadequate to achieve the desired temperature, particularly, when one or more room spaces have vastly different cooling or heating requirements. For example, consider a situation in which the first room space 102 has a south-facing window and the second room space 104 does not. The resulting extra sunlight in the first room 102 space may create the need for much more cooling air flow than that which is needed for the second room space 104. The various heating and cooling coils may be manipulated to ensure sufficient cooling in the first room space 102 without overcooling in the second room space 104. For example, the chilled water coil 142 would coordinate with the AHU 110 to provide air that is sufficiently cooled to satisfy the needs of the first room space 102, and the heating coil 138 would warm the highly cooled air from the shaft 124 to a more moderate level for the second room space 104.

In accordance with aspects of the present invention, the HVAC elements of FIG. 1, as well as the corresponding control circuitry not shown in FIG. 1 (see FIG. 2), are represented by at least one control device in a building model. The building model provides information regarding capabilities and operations of the individual elements, as well as information as to how the elements interrelate within the building system. Further details regarding an exemplary building model according to the invention are provided below in connection with FIG. 3

Figure 2:
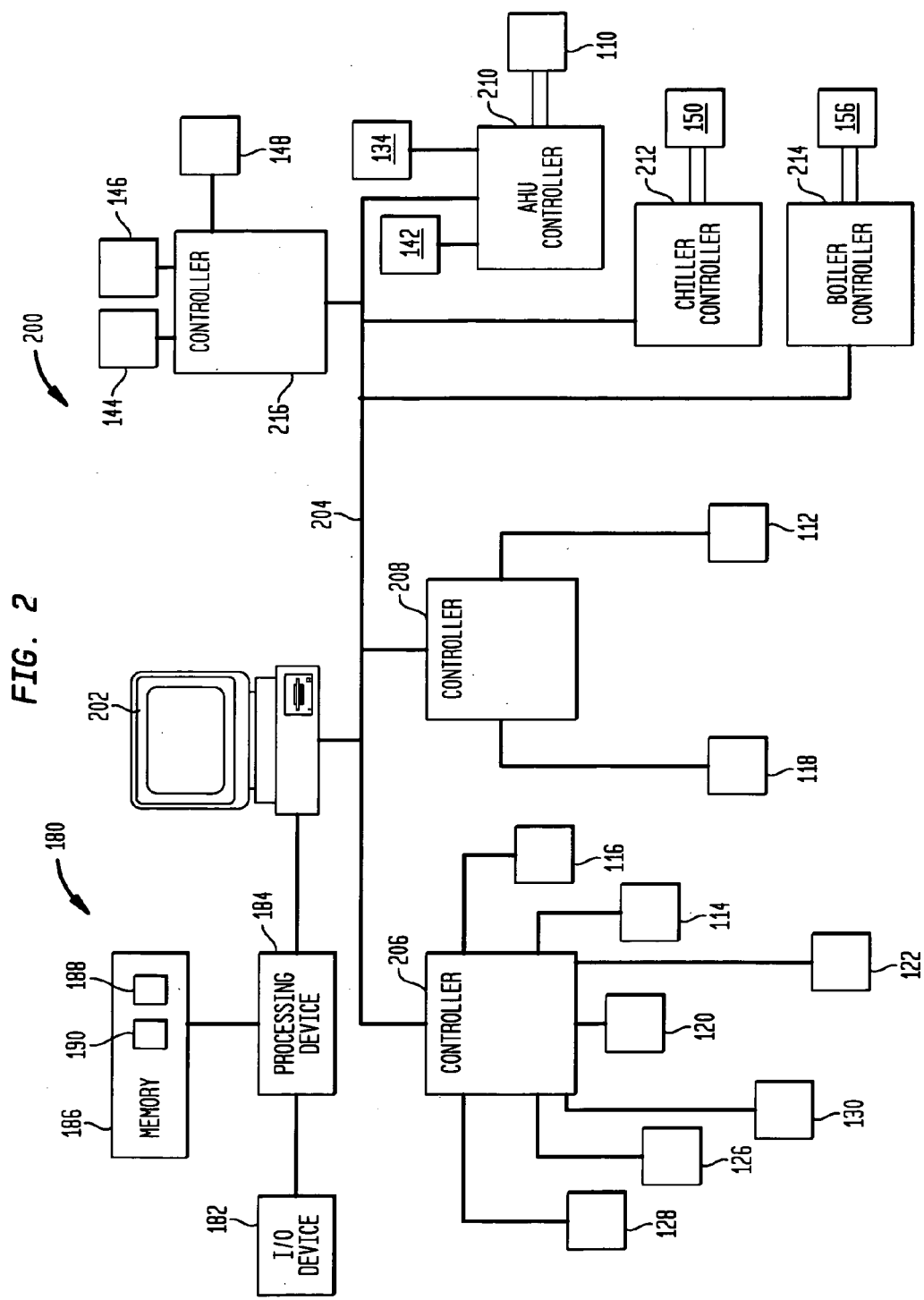
FIG. 2 shows a schematic diagram of the building automation system that employs the HVAC elements of the building space of FIG. 1.

FIG. 2 shows a schematic representation of the HVAC system 200 that includes electrical control and communication devices as well as the HVAC system mechanical elements shown in FIG. 1. The HVAC system 200 includes a control station 202, a building network 204, first, second and third equipment controllers 206, 208 and 216, an air-handling unit controller 210, a chiller controller 212 and a boiler controller 214. The control station 202 is a device that provides status monitoring and control over various aspects of the HVAC system 200. By way of example, the control station 202 may suitably be an INSIGHT™ model workstation available from Siemens Building Technologies, Inc., discussed further above. The building network 204 is a communication network that allows communication between the control station 202 and the controllers 206, 208, 210, 212, 214 and 216, as well as other devices not depicted in FIG. 2. Such building networks are known in the art. Suitable building communication networks designed for use with the INSIGHT™ model workstation include building level networks available with the APOGEE™ building automation system also available from Siemens Building Technologies, Inc.

The first controller 206 is a device that is operable to receive one or more sensor inputs and generate controlled process outputs based on the sensor inputs and one or more set points. Sensor inputs, for example, may be representative of measured temperature values. Controlled process outputs, for example, may be actuator signals that cause a ventilation damper to further open or further close. Various suitable commercially available equipment controllers are known in the art, including modular equipment controllers available from Siemens Building Technologies, Inc.

To generate the process output based on set points and sensor inputs, the first controller 206 is operable to perform a control function, such as a proportional control function, a proportional-integral control function, or a proportional-integral-derivative ("PID") control function (or possibly others). Such control functions use values representative of a measured phenomenon to determine how to manipulate a physical process to attempt to bring the measured phenomenon toward a set point.

In the embodiment shown in FIG. 2, the equipment controller 206 is operable to generate an output that causes either or both of the dampers 114 and 116 to open or close in response to temperature sensor values received from the temperature sensors 126 and 128. To this end, the dampers 114 and 116, as discussed above, include associated actuators that are capable of moving the damper blades or fins responsive to control signals. The equipment controller 206 is further operable to cause the valve to allow hot water to flow through coils 136 and/or 138. As with the dampers, the coils 136 and 138 include associated actuators that are capable of opening and closing flow valves responsive to control signals. Details regarding actuators and their use with devices such as dampers and water valves would be known to those of ordinary skill in the art.

The equipment controller 206 is further operable to receive the set point temperature value from the space temperature adjuster 130. In some embodiments, the equipment controller 206 may receive temperature set points from other devices, such as the control station 202, via the building network 204. The equipment controller 206 may utilize set points from the control station 202 and the space temperature adjuster 130 at different times of day, or for different purposes.

Regardless of whether the set point is received from the control station, the equipment controller 206 is also operable to communicate to other system control elements such as the control station 202 and the other equipment controllers 208, 210, 212, 214 and 216 over the building network 204. Information is communicated between controllers in order for the temperature, fresh air flow and other parameters may be controlled through efficient combinations of operations of the various ventilation dampers, heating and cooling coils and the AHU.

The other equipment controller 208 is operable to generate an output that causes the shaft damper 112 to open or close in response to one or more sensor signals and set points. For example, the determination to further open or close the shaft damper 112 may depend at least in part on the measured air flow in the shaft branch 124. To this end, the equipment controller 208 is also operable to receive shaft air flow values from the shaft flow sensor 118. The controller 208 may then suitably be configured to generate the output based on the received shaft air flow values and a set point set by the control station 202. The control station 202 may alter the set point based in part on the temperature values measured by the temperature sensors 126 and 128, operating characteristics of the AHUr 110, or combinations of many factors.

The AHU controller 210 is operable to control the AHU device 110, as well as the associated chilled and heated water coils 142 and 134 respectively. The AHU controller 210 is operable to control such devices based on a variety of parameters, including for example, information from the other controllers 206 and 208. For example, if the temperature values from the sensors 126 and 128 indicate that the temperature in the spaces 102 and 104 needs to be reduced, and the controller 206 has opened the either of the dampers 114 or 116 to the fullest or near fullest extent, such information is communicated to the AHU controller 210. The AHU controller 210 then causes the valve of the chilled water coil 142 to be opened, to allow the AHU 110 to advance cooler air to the room spaces 102 and 104 via the shaft 124.

The chiller controller 212 is configured to control the operation of the chiller plant 150, and the boiler controller 214 is configured to control the operation of the boiler 156. Such control devices are known in the art. The equipment controller 216 controls the operation of the dampers 144, 146 and 148 to manage the recirculation of air within the facility. As is known in the art, recirculation of air helps reduce energy usage costs because the recirculated air is typically more near the desired temperature than fresh outside air. However, buildings require at least some fresh air to maintain a healthy environment. The dampers 144, 146 and 148 are controlled to provide an appropriate balance of fresh and recirculated air using control methods known in the art. To this end, the room spaces 102, 104, the ventilation shaft branch 124, and/or other locations may include air quality sensors, not shown, that indicate whether more fresh air is required.

It will be appreciated that the control algorithms and schemes of the HVAC system 200 are given by way of illustrative example, and that those of ordinary skill in the art may readily device suitable control schemes for HVAC systems of any particular building space. The exact nature of how to develop specific applications of control schemes is outside the scope of the disclosure and would be readily apparent to those of ordinary skill in the art.

In accordance with the present invention, a system 180 for developing and storing a model of the building system 100 is operably connected to communicate to the control station 202. Such a connection may be through an intranet, the Internet, or other suitable communication scheme. In alternative embodiments, the system 180 and the control station 202 are present on the same host computer system.

In any event, the system 180 includes I/O devices 182, a processing circuit 184 and a memory 186. The I/O devices 182 may include a user interface, graphical user interface, keyboards, pointing devices, remote and/or local communication links, displays, and other devices that allow externally generated information to be provided to the processing circuit 184, and that allow internal information of the system 180 to be communicated externally.

The processing circuit 184 may suitably be a general purpose computer processing circuit such as a microprocessor and its associated circuitry. The processing circuit 184 is operable to carry out the operations attributed to it herein.

Within the memory 186 is a model 188 of the building system 100. The model 188 is a collection of interrelated data objects representative of, or that correspond to, elements of the building system 100. Elements of the building system may include any of the illustrated in FIGS. 1 and 2, as well as other elements typically associated with building systems. Building system elements are not limited to HVAC elements, but may include security devices such as the security sensor 132 or the like, fire safety system devices, lighting equipment, or other building equipment.

Figure 3:
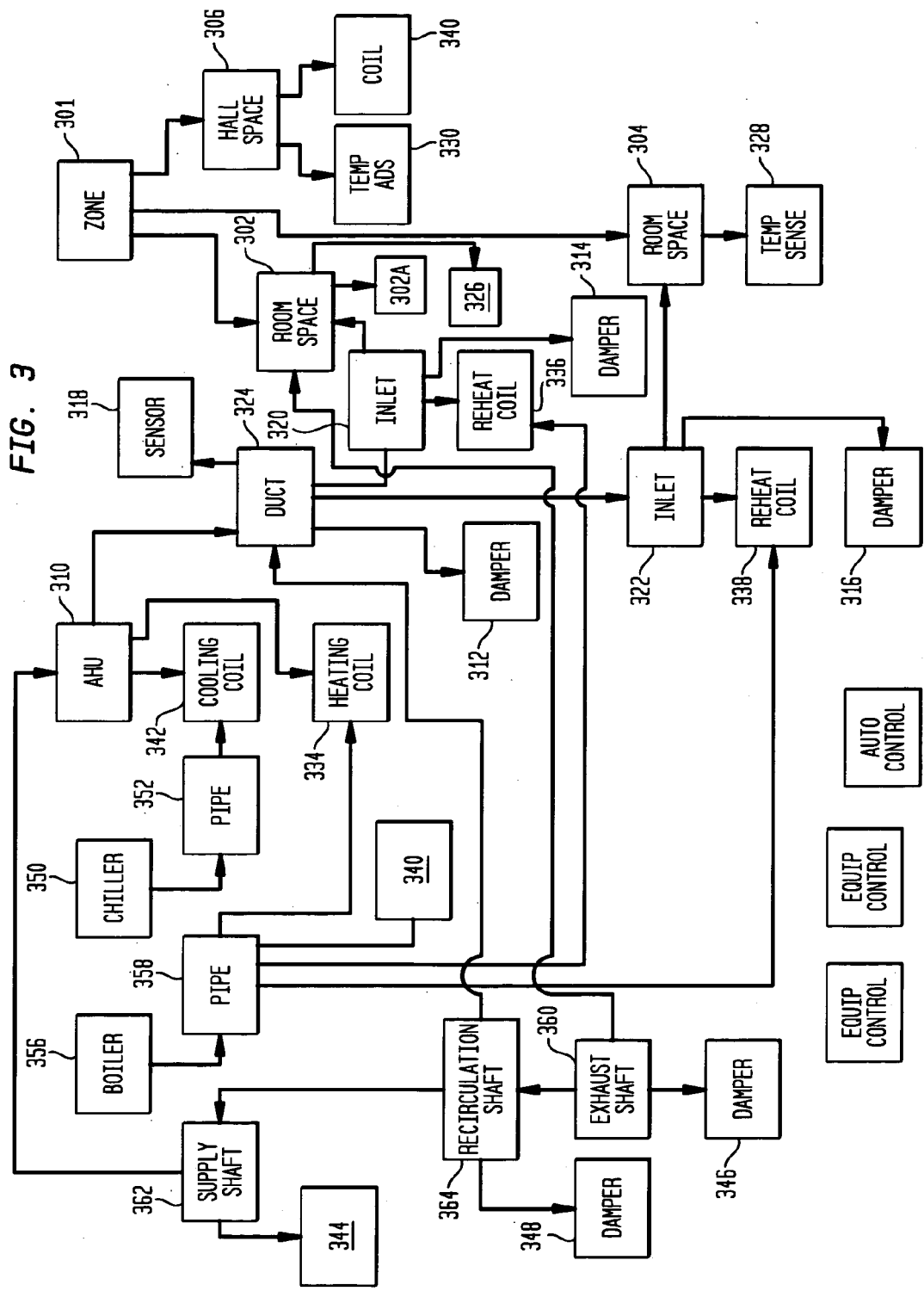
FIG. 3 shows a block diagram representation of an exemplary model of the building system illustrated in FIGS. 1 and 2, the model incorporating aspects of the invention.

An example of the model 188 of the HVAC system 200 of FIGS. 1 and 2 is illustrated in FIG. 3 in further detail. With reference to FIG. 3, the model 188 includes a building zone object 301, a first room space object 302, a first window object 302a, a second room space object 304, a hall space object 306, an AHU object 310, a shaft damper object 312, a first room damper object 314, a second room damper object 316, a flow sensor object 318, a first room inlet object 320, a second room inlet object 322, a shaft branch object 324, a first temperature sensor object 326, a second temperature sensor object 328, a space temperature adjuster object 330. The model 188 may also include a mechanical space object, but it is not shown in FIG. 3 for the purposes of clarity of exposition.

The model 188 also includes a chiller plant object 350, a chilled water object 352, a boiler object 356, a hot water/steam pipe object 358, a reheat coil object 336, a reheat coil object 338, a supply shaft object 362, a recirculation shaft object 364, an exhaust shaft object 360, an exhaust damper object 346, a supply damper object 344, and an exhaust damper object 346.

The model 188 also includes controller elements, such as those corresponding to the controllers 206, 208, 210, 212, 214 and 216. These are discussed further below. In general, the interrelationship of the objects corresponding to controllers 206, 208, 210, 212, 214 and 216 generally follows the interrelationships of the schematic diagram of the system 200 in FIG. 2. For example, the object corresponding to the controller 208 interrelates to the objects corresponding to the damper 112 and the flow sensor 118.

The objects generally relate to either primarily physical building structures or building automation system devices. Building structure (or space) objects correspond to static physical structures or locations within a building space, such as room spaces, hall spaces, mechanical spaces, and shaft elements. Building automation system device objects correspond to active building automation system elements such as sensors, dampers, controllers and the like. It is noted that some elements, such as ventilation shaft elements, could reasonably qualify as both types of elements in other embodiments. However, in the exemplary embodiment described herein, the shaft elements are considered to be building structure elements as they tend to define a subspace within the building space.

Each object in the model 188 corresponds to an element of the building system of FIGS. 1 and 2. Table 1, below lists the objects, and defines the element of the building system to which they correspond.

TABLE 1

| OBJECT No. | CORRESPONDING ELEMENT |
| --- | --- |
| 301 | Zone 100 |
| 302 | Room Space 102 |
| 302a | Window 102a |
| 304 | Room Space 104 |
| 306 | Hall Space 106 |
| 308 | Mechanical Space 108 |
| 310 | AHU 110 |
| 312 | Shaft Damper 112 |
| 314 | First Room Damper 114 |
| 316 | Second Room Damper 116 |
| 318 | Flow Sensor 118 |
| 320 | Room Inlet 120 |
| 322 | Room Inlet 122 |
| 324 | Shaft Branch 124 |
| 326 | Temperature Sensor 126 |
| 328 | Temperature Sensor 128 |
| 330 | Temperature Adjuster 130 |
| 334 | Heating Coil 134 |
| 336 | Heating Coil 136 |
| 338 | Heating Coil 138 |
| 340 | Heating Coil 140 |
| 342 | Chilled Water Coil 142 |
| 344 | Supply Damper 144 |
| 346 | Exhaust Damper 146 |
| 348 | Recirculation Damper 148 |
| 350 | Chiller Plant 150 |
| 352 | Chilled Water Distribution Pipe 152 |
| 356 | Boiler 156 |
| 358 | Hot Water/Steam Distribution Pipe 158 |
| 360 | Exhaust Shaft 160 |
| 362 | Supply Shaft 162 |
| 364 | Recirculation Shaft 164 |
| 406 (not in FIG. 3) | Equipment controller 206 |
| 408 (not in FIG. 3) | Equipment controller 208 |
| 410 (not in FIG. 3) | AHU controller 210 |
| 412 (not in FIG. 3) | Chiller controller 212 |
| 414 (not in FIG. 3) | Boiler controller 214 |
| 416 (not in FIG. 3) | Equipment controller 216 |

Each object is a data object having a number of fields. The number and type of fields are defined in part by the type of object. For example, a room space object has a different set of fields than a temperature sensor object. A field usually contains information relating to a property of the object, such as a description, identification of other related objects, and the like.

Figure 8B:
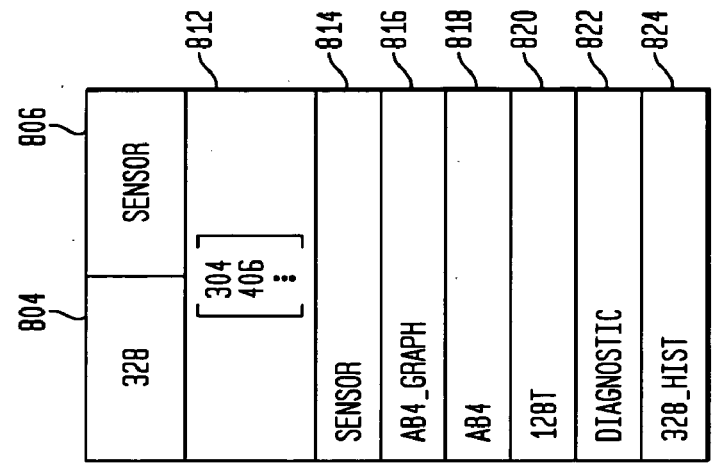
FIGS. 8a and 8b show block diagrams of temperature sensor objects of the model of FIG. 4 generated from the temperature sensor template of FIG. 8.

The model 188 is built by creating objects from a library of templates 190 (see FIG. 2), which may also be stored in the memory 186. The library of templates 190 contain templates for several types of objects, and ideally for all types of object. Various examples of templates are discussed herein. In particular, FIG. 5 shows a building zone template 502, FIG. 6 shows a room space template 602, FIG. 7 shows an inlet shaft segment template 702, FIG. 8 shows a temperature sensor template 802, and FIG. 9 shows a damper space template 902. Other templates for other elements may be developed by those of ordinary skill in the art applying the principles illustrated herein.

It is also noted that the diagram of the model in FIG. 3 shows parent/child relationships between the objects of the model. In FIG. 3, an arrow between two objects symbolizes a parent/child relationship. The arrowhead points to the child of the relationship. Thus, for example, the distribution pipe object 358 as illustrated in FIG. 3 has four child objects, coil objects 334, 336, 338 and 340, and one parent object, the boiler object 356. These parent/child relationships provide the model 188 with the potential for a large range of uses. The parent/child relationships allow for all aspects that relate to or affect a room space, device, or duct, to be accessed in a logical manner.

For example, according to the model 188, the room space object 302 has immediate parent objects of the inlet object 320 and the exhaust shaft object 360. The model 188 allows for further analysis of the room space object 302 by providing information that identifies the parent and child objects of the inlet object 320 and the exhaust shaft object 360. One may use this information to determine that the reheat coil 336, the damper 314 and the duct 324 relate (as related objects of the inlet object 320) to the room space object 302. Such associations may be used to determine the source of malfunctions, study system efficiency, adjust operating parameters and the like.

In the exemplary embodiment described herein, a parent object is basically defined as an object that either contains, controls or otherwise affects, a child node. For example, the zone object 301 is a parent to the room space objects 302 and 304 because the building zone 101 (corresponding to the object 301) contains the room spaces 102 and 104 (corresponding to the objects 302 and 304). The inlet object 320 is a parent to the room space object 302 because the inlet 120 is the source of cooling and heating air to the room 120, and therefore "affects" room 120. In the embodiment described herein, the room inlet object 320 is also the parent to the heating coil object 336 and the damper object 314 because the corresponding room inlet 120 contains the heating coil 136 and the damper 114. Equipment controller objects, such as the controller object 406, are parent objects to all of the devices that they control, or which are "anchored" to it. For example, the equipment controller 206 controls the dampers 114 and 116, and thus the corresponding objects 314 and 316 are child objects of the corresponding equipment control object 406. Also, because the temperature sensor 130 is connected to the equipment controller 206, the corresponding equipment controller object 406 is the parent object to the temperature sensor object 330.

It will be appreciated that an object may have multiple parent objects and/or multiple children objects. FIG. 3 generally illustrates how the objects corresponding to the building system elements of FIG. 1 would be assigned parent/child relationships. This schema may plainly be applied to any type of building system using the same concepts.

It will be appreciated that other methods of defining parent and children nodes may be implemented. However, it is preferable that the definition be consistent throughout the model 188 so that use of the model 188 is predictable.

FIG. 4 shows an exemplary method that may be used to generate a model such as the model 188. In step 402, the user generates a new object for a selected building system element, and gives the object an identification value or name. To this end, the user may enter information through the I/O devices 182 of the system 180 of FIG. 2.

Thereafter, in step 404, the user selects an object template corresponding to the selected building system element. To this end, the processing device 184 may cause the I/O devices 182 to display one or more menus of templates available from the template library 190 stored in the memory 186. The user may then use the I/O devices 182 to enter a selection, which is received by the processing device 184.

Then, in step 406, the user instantiates the selected object template by providing appropriate values to the fields available in the object template. To this end, the processing device 184 may suitably prompt the user for each value to be entered as defined by the selected template. The types of values entered will vary based on the type of template. Building structure templates vary, but share some similarities, as do building automation device templates.

Once the object is instantiated, the processing circuit 184 stores the object in the memory 156 in a manner that associates the object with the model 188. In step 408, the user may select whether additional objects are to be created. If not, then the process is completed. If so, however, then the user creates and names a new object in step 402 and proceeds as described above.

Examples of templates, and how such templates would be populated or instantiated using the data of the building system of FIGS. 1 and 2, are provided below in connection with FIGS. 5-9. It will be appreciated that the objects may suitably take the form of an XML object or file.

FIG. 5, for example, shows a building zone template 502. When the user creates an object for the building zone 100 of the building system of FIGS. 1 and 2, the user employs the building zone template 502. The building zone template 502 in the exemplary embodiment described herein has a unique identifier value 504, a type identifier 506, and four fields: a child field 512, a graphic field 514, a parent field 516, and a common name field 518. The data structure contained in, or pointed to by the value in, the child field 512 is an array and may have multiple values. Each element of the array is an identifier value for child entities of the building, such as room spaces, hall spaces and the like. The identifier value may suitably be the identifier of the object corresponding to those child entities. The child field 512 thus allows the building object to be associated with other objects, namely room space, hall space and other space objects, in the model 188. In some embodiments, the child field 512 of the building zone object may include the controllers located in, or controlling devices located in the building zone.

The graphic field 514 contains a pointer to a graphics file. The graphics file contains a graphical representation of the zone, such as a floor plan similar to that illustrated in FIG. 1. The data structure for the parent field 516 may suitably be an array. The values in the parent field 516 may suitably include the identifier for the building object of the building in which the building zone is located. For example, the building zone 100 of FIG. 1 may be a floor or wing of a building, and thus its parent object is the object for the entire building. The common name field 518 is a string. The common name field 518 could contain a commonly known name for the building zone, such as the "first floor", or "eastern wing". Thus, the building zone template 502 provides two ways to identify the building: the system object identifier and the common name.

FIG. 5a shows the building object 301 formed by instantiating the building template 502 with the data associated with the zone 100. The name "100_GRAPHIC" represents the file reference for the graphic of the zone 100, and the name "BLDG_OBJECT" represents an object name for an object that describes the overall building, not shown, but which includes the building zone 100. The child nodes of the building zone object 301 include the room space objects 302, 304, and the hall space object 306, as illustrated in FIG. 3. However, it will be appreciated that in the embodiment described herein, the child objects of the building zone object 301 also includes the mechanical space structures, such as shafts 324, 360, 362 and 364. Such connections are not shown in FIG. 3 for purposes of clarity of exposition. The controllers 406, 408, 410, 412, 414 and 416 may also suitably be child objects of the building space object 301.

FIG. 6 shows a room space object template 602. When the user creates an object for each of the first room space 102 and the second room space 104, the user employs the room space object template 602. The room space object template 602 in the exemplary embodiment described herein has an identifier value 604, a type identifier 606, and eight or more other fields, including a child field 612, a parent field 614, a graphic field 616, a sensor value field 620, a square foot field 622, a volume field 624, a location field 626, and a programming instruction field 628.

The data structure for the child field 612 is an array, with each element of the array being an identifier value for child entities of the room space, including architectural, sensor and actuator elements that are located in or affected by the room space. Architectural structures can include cubicles, work spaces or other subdivisions of a room. Because the types of possible child objects for each room space object is predetermined, the child field 612 may have a structure in which the known types of child objects (architectural, sensor and actuator) are arranged in a predetermined configuration in the data structure. Thus, devices that access child object information from the data structure can identify the type or class of each child object based upon its location within the child field array 612.

The data structure of the parent field 614 may also be an array. As with the child field 612, a room space has known types or classes of parents. In the embodiment described herein, such parent objects can include architectural, supply air and exhaust air objects. Accordingly, the parent field 614 defines an array with specific locations for architectural, supply and exhaust parent objects.

The graphic field 616 contains a pointer to a graphics file that contains a graphical representation of the room space. The data structure for the sensor value field 620 is an array containing the identification of each sensor value generated within the room. The sensor value field 620 should typically, but need not, contain values that correspond to sensor objects in the child field 612. In particular, any device that provides a temperature reading of a room space typically is located within that room space and is therefore a child object of that room space in the embodiment described herein. Regardless, in most advanced HVAC systems, each sensor value is a data point that may accessed by an identifier. Each sensor value is associated (within the model 188 and the HVAC system 200) with the sensor device that created it. For example, the temperature measured by the temperature sensor 126 may be identified as data point 126t. As discussed above, the sensor value field 620 contains an array of such sensor value data point identifiers.

The square foot and volume field 622 may contain integer or floating point values that provide information on the dimensions of the room space. The location field 626 is a data structure that contains coordinates and possibly shape information of the room space. The data structure of the location field 626 may suitable be an array of coordinates of four corners of the room space, or may be the coordinates of the center point of the room space.

The programming instruction field 628 contains object-specific software programs that may be accessed by the control station 202 of the system. While the control system 202 has many of its own operations, each object has the capability of having one or more specific software programs associated therewith. The object-specific programs can include programs that calibrate equipment, create temperature or occupancy logs, trend sensor data, and the like. Those of ordinary skill in the art may readily devise appropriate software programs as desired for various elements of the system.

Other fields, not shown, may otherwise identify the building automation equipment that is present in the room space.

FIG. 6a shows the room space object 302 formed by instantiating the room space template 602 with the data associated with the first room space 102. In FIG. 6a, the identification field 604 contains the object identifier "302". The type field 606 identifies that the object is a room space object. The child field 612 has an array of values identifying an architectural child object 302a, which corresponds to the window structure 102a, a sensor child object 326, which corresponds to the temperature sensor 126, and no actuator child objects. The parent object field 614 of the room space object 302 identifies an architectural parent object 301, which corresponds to the building zone 100 in which the room space 302 is located, a supply air inlet parent object 320, which corresponds to air inlet 122, and an exhaust air outlet parent object 360, which corresponds to the exhaust outlet shaft 160. It is noted that the child objects and parent objects in the fields 612 and 614 of the room space object 302 correspond to relationships illustrated in FIG. 3 for the room space object 302.

The graphic field 616 contains the file name or pointer name for a graphic file, exemplified herein as a file entitled "102_Graphic". The graphic file in the field 616 preferably includes information sufficient to provide a visual displayable rendering of the room space 102 similar to that of room space 102 in FIG. 1. Such graphic information may suitably be limited to that of the room space 102 alone, such that combination graphic depictions such as that of FIG. 1 may be accomplished by combining the individual graphic files of various objects. In another example, the graphic file 102_Graphic may be defined such that all child objects associated with the room space object 302 are automatically incorporated into the displayable image data. Other display methods and methods of combining graphics of various objects may be implemented.

Referring again to the room space object 302, the sensor value field 620 identifies the sensor value generated by the sensor 126. That value is represented herein as "126t". The square feet and volume field 622 contains exemplary values 110 (in square feet) and 1014 (in cubic feet), identifying that the room space 102 has an area of 110 square feet and a volume of 1014 cubic feet.

The location field 626 includes an exemplary set of Cartesian (x-y) coordinate values, 472, 318. Such values are preferably referenced to a grid on which the floor plan of the building may be plotted. In this example, the location field 626 identifies coordinates of the center point of the room space 102.

The programming instruction field 628 in this example is empty, representing that the room space object 302 has no specific software instructions.

The above example provides a sample of how the room space object template 602 may be populated for the room space object 302 corresponding to room space 102 of FIG. 1.

In FIG. 6b shows the room space object 304 formed by instantiating the room space template 602 with the data associated with the second room space 104. The room space object 304 of FIG. 6b is somewhat similar to that of the room space object 302, with exceptions. For example, unlike the room space object 302, the child object field 612 of the room space object 304 only includes the sensor child object 328, and no architectural child objects.

In other portions of the object definition, the parent object field 614 of the room space object 304 identifies an architectural parent object 301 (as with the room space object 302) and a supply air inlet parent object 322, which corresponds to air inlet 122. The graphic field 616 identifies a corresponding graphic file, and the size and location fields 622 and 626, respectively, are populated with values specific to the room space 304. Similar to the room space object 302, the room space object 304 does not contain any programming instructions in the corresponding field 628.

FIG. 7 shows an inlet object template 702. When the user creates an object for each of the room inlets 120 and 122, the user employs the inlet object template 702. The inlet object template 702 in the exemplary embodiment described herein has an identifier value 704, a type identifier 706, and eight or more other fields, including a child field 712, a parent field 714, a graphic field 716, a sensor value field 718, a cross-sectional area field 720, a length field 722, a location field 726, and a programming instruction field 728.

The data structure for the child field 712 is an array, with each element of the array being an identifier value for child entities of the inlet object, including architectural, sensor and actuator elements that are located in or affected by the inlet object. As discussed above, it will be appreciated that an inlet "device" may suitably be a VAV box as is known in the art.

Architectural child objects for an inlet object can include room spaces, hall spaces or other areas in which the inlet objects provides air flow communication. As with the child field 612 of FIG. 6, the child field 712 may have a structure in which the known types of child objects (architectural, sensor and actuator) are arranged in a predetermined configuration in the data structure.

The data structure of the parent field 714 may also be an array. As with the child field 712, an air inlet has known types of parents. In the embodiment described herein, such parent objects include only architectural objects, which will typically be the shaft that supplies air to the air inlet structure.

The graphic field 716 contains a pointer to one or more graphics files that contain one or more graphical representations of the inlet structure. The data structure for the sensor value field 718 is an array containing the identification of each sensor value generated within the inlet structure. As with room space objects, the sensor value field 718 of inlet objects should typically, but need not, contain values that correspond to sensor objects identified in the child field 712.

The cross section and length fields 720 and 722 may be integer or floating point values that provide information regarding the dimensions of the inlet structure. The location field 726 is a data structure that contains coordinates of the inlet structure. The coordinates of the inlet are preferably in the same scale/coordinate system as that of the room space objects.

The programming instruction field 728 contains inlet object-specific software programs that may be accessed by the control station 202 of the system. As discussed above, the object-specific programs can include programs that calibrate equipment, create temperature or occupancy logs, trend sensor data, and the like. Those of ordinary skill in the art may readily devise appropriate software programs as desired for various elements of the system.

FIG. 7a shows the inlet segment object 320 formed by instantiating the inlet segment template 702 with the data associated with the first inlet segment 120. FIG. 7b shows the inlet segment object 322 formed by instantiating the inlet segment template 702 with the data associated with the second inlet segment 122.

Referring in detail to FIG. 7a, the identification field 704 of the inlet segment object 320 contains the object identifier "320". The type field 706 identifies that the object is an air inlet object. The child field 712 has an array of values identifying an architectural child object 302, which corresponds to the room space object 102, no sensor child objects, and two actuator child objects 314 and 336, which correspond to the ventilation damper 114 and heating coil 136, respectively. The parent object field 714 of the air inlet object 320 identifies an architectural parent object 324, which corresponds to the shaft 124. These parent/child relationships are illustrated in FIG. 3.

The graphic field 716 in the example described herein contains no file name or pointer name for a graphic file, as there may not be graphics for some devices such as air inlets. The sensor value field 718 in this example contains nothing, as there are no sensors in the air inlet. The cross sectional area field 720 contains a number 44 representative of an exemplary size, in square inches, of the air inlet. The length field 722 contains an exemplary length value of 12, representing 12 inches. The location field 726 includes an exemplary set of Cartesian coordinate values, 480, 321. As discussed above, such values are preferably referenced to the same grid as the location field values of the room space objects 302 and 304. With such information, the relative proximity of objects or devices and room spaces may be determined, and maps may be generated.

The programming instruction field 728 in this example is empty, representing that the air inlet object 320 has no specific software instructions.

The above example provides a sample of how the air inlet object template 702 may be populated for the air inlet object 320 corresponding to air inlet 120 of FIG. 1. FIG. 7b shows how the template 702 is instantiated with data for the other air inlet object 322, corresponding to the air inlet 122 of FIG. 1.

FIG. 8 shows a temperature sensor object template 802. When the user creates an object for each of the first temperature sensor object 126 and the second temperature sensor object 128, the user employs the temperature sensor object template 802. The temperature sensor object template 802 in the exemplary embodiment described herein has an identifier value 804, a type identifier 806, and seven or more fields: a parent field 812, a vendor field 814, a characteristics field 816, a vendor model field 818, a measured temperature point identifier field 820, a programming instruction field 822, a historical maintenance data field 824 and possibly others.

The data structure of the parent field 812 may suitably be an array. The parent field 812 of a sensor object has known types of parents. In the embodiment described herein, such parent objects include only architectural objects, namely, the space in which the temperature sensor is located, and control objects (i.e. equipment controllers), including the devices that obtain sensor values from the sensor device.

The vendor field 814 may suitably be a string value (or a look-up table code) that identifies the vendor for the sensor. The characteristics field 816 contains a pointer a string, array, graphic or other file that provides characteristics of operation of the sensor, such as graphic performance information or the like. The characteristics field 816 generally identifies largely static information, such as data sheets from the manufacturer or vendor of the sensor. The vendor model field 818 is a string value providing the commercial model number for the device.

The measured temperature point identifier field 820 contains of the identification of the system data point of the temperature measured by the sensor. As discussed further above, each measured value (and also control value) has a data point identifier in a typical HVAC network. The temperature sensor object template 802 thus contains at least one field that identifies the data point in which the temperature data obtained by the temperature sensor is stored and transported.

The programming instruction field 822 contains inlet object-specific software programs that may be accessed by the control station 202 of the system. As discussed above, the object-specific programs can include programs that calibrate equipment, create temperature or occupancy logs, trend sensor data, and the like. Those of ordinary skill in the art may readily devise appropriate software programs as desired for various elements of the system.

The maintenance history field 824 is a pointer to a dynamic file that stores maintenance information regarding the sensor device. Such information may include repair logs, preventative maintenance logs, and the like.

Figure 8A:
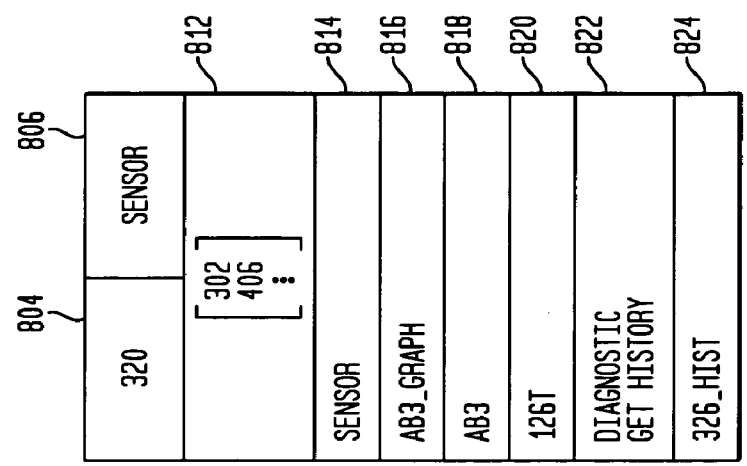
Figure 8:
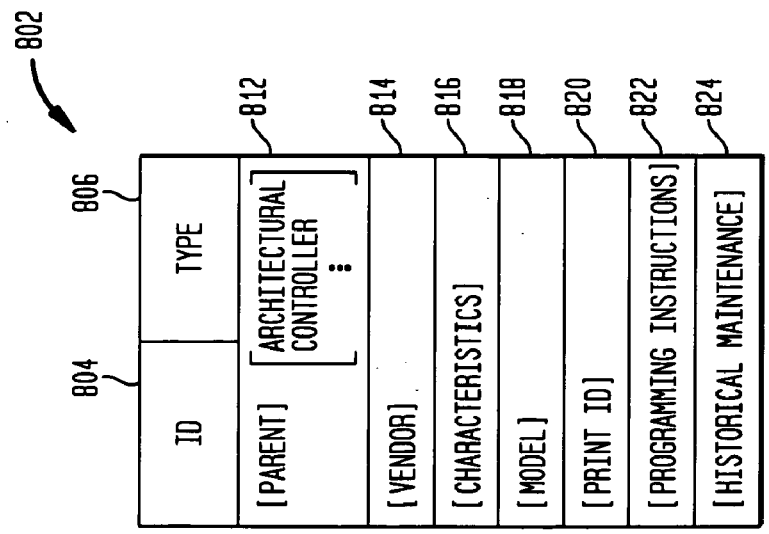
FIG. 8 shows a block diagram of an exemplary temperature sensor template for use in generating temperature sensor objects in a model according to an embodiment of the invention.

FIG. 8a shows the temperature sensor object 326 formed by instantiating the temperature sensor template 802 with the data associated with the first temperature sensor 126. FIG. 8b shows the temperature sensor object 328 formed by instantiating the temperature sensor template 802 with the data associated with the second temperature sensor 128.

Referring in detail to FIG. 8a, the identification field 804 of the sensor object 326 contains the object identifier "326". The type field 806 identifies that the object is a sensor object. Either the type field 806 or an additional field may be used to identify that the sensor object 326 relates to a temperature sensor, as opposed to a flow sensor or other type of sensor.

The parent object field 812 of the sensor object 326 identifies an architectural parent object 302, which corresponds to the room space 102, and the controller object 406, which corresponds to the equipment controller 206 of FIG. 2. These relationships correspond to the relationships of the sensor 126 and sensor object 326 of FIGS. 2 and 3, resepectively.

The vendor field 814 contains the name of a the vendor or manufacture that supplied the sensor device, named "SENSCO" in the example herein. The characteristic field 816 in the example described herein contains a file name or pointer name for a graphic file, named herein by example as AB3_GRAPH. AB3_GRAPH may suitably be a graph of performance specifications proved by the manufacturer.

The model field 818 in this example identifies the model of the sensor device as a "AB3" model device. The point identification field 820 identifies that the value generated by the sensor device corresponds to the point "126*t*" of the control system.

The programming instruction field 828 in this example identifies two software routines. One routine is a diagnostic program that, when executed, causes a diagnostic routine to be performed that is specific to the sensor 126. The other routine is a routine that allows storing and retrieving maintenance history records from the maintenance history field 824. The maintenance history field 824 preferably stores a file, 326_HIST, that contains the maintenance history of the sensor, including date of installation, date of calibration, etc.

The above example provides a sample of how the sensor object template 802 may be populated for the sensor object 326 corresponding to the temperature sensor 126 of FIG. 1.

FIG. 8b shows how the template 802 is instantiated with data for the other sensor object 328, corresponding to the temperature sensor 128 of FIG. 1.

FIG. 9 shows a damper object template 902. When the user creates an object for each of the dampers 112, 114 and 116, the user employs the damper object template 902. The damper object template 902 in the exemplary embodiment described herein has an identifier value 904, a type identifier 906, and eight or more fields: a parent object field 912, a vendor field 914, a characteristics field 916, a vendor model field 918, and a damper actuator control value point identifier field 920, a programming instruction field 922, a maintenance history field 924, and a calibration data field 926.

The data structure for the parent object field 912 is similar to that of the parent object field 812 of the template 802 of FIG. 8. Similarly, the vendor field 914, the characteristics field 916, the vendor model field 918, the programming instruction field 922 and the maintenance history field 924 are all similar to their counterparts of the sensor object template 802 of FIG. 8. However, the damper actuator control value point identifier field 920 contains an identifier to a control variable or "point" that is used to control the damper position. In particular, as is known in the art, a damper position is physically moved by an actuator. The actuator causes the movement responsive to received control values. The point identifier field 920 identifies the variable which is used to provide control values to the actuator for the damper described in the object.

In addition, the damper object template 902 further includes the calibration data field 926, which contains information correlating the control signals for the damper actuator with the actual position of the damper (and/or flow through the damper).

FIG. 9a shows the damper object 312 formed by instantiating the damper template 902 with the data associated with the shaft damper 112. FIG. 9b shows the damper object 314 formed by instantiating the damper template 902 with the data associated with the first room damper 114.

It will be appreciated that suitable templates may readily be created by those of ordinary skill in the art for other elements, such as, for example, flow sensors and shaft branches, water valve actuators, controllers, and other devices of the building system 100, as extensions of the examples described above. Using the above examples as a guide, those of ordinary skill in the art may readily develop appropriate templates for other building automation systems, such as security systems, fire safety systems, and the like.

The building model 188 thus provides a relatively comprehensive description of each of the building automation system devices, and relates those devices to the physical structure of the building. To this end, the building automation system device objects include, in addition to references to relevant control values of the device, but also information as to what part of the building space in which the device is located. Moreover, the building space objects are arranged hierarchically, to further interrelate system devices and values with different "zoom" levels of the building structure. It will be appreciated that the actual data objects may take many forms and still incorporate these features of the invention.

The model 188 and different models incorporating the same general principles have limitless potential for enhancing building automation system services. Software applications may use the model 188 to relate building information innumerable ways to provide better understanding and operation of building systems.

It will be appreciated that the above describe embodiments are merely exemplary, and that those of ordinary skill in the art may readily devise their own modifications and implementations that incorporate the principles of the present invention and fall within the spirit and scope thereof.

We claim:

1. An arrangement for coordinating data representative of a building system, comprising:
   a processor connected to a memory, the memory storing,
   a plurality of building space objects, at least one building space object including
      a reference to at least one of the group consisting of a parent building space object and a child building space object,
      a reference to at least one graphic file containing a graphic image representation of the building space, and
      a reference to information regarding one or more building automation devices associated with the building space object; and
   at least one building automation device object, each building automation device object including
      a reference to a corresponding building space object,
      a reference to at least one operating value of the building automation device, and
      a reference to a link to a file containing information regarding the at least one building automation device object.

2. The arrangement of claim 1 wherein the at least one building space object further includes information identifying:
   a reference to building space size information.

3. The arrangement of claim 2 wherein the building space size information includes building space volume information.

4. The arrangement of claim 1 wherein the at least one building automation device object comprises a controller object.

5. The arrangement of claim 1 wherein the at least one building automation device object comprises a temperature sensor object.

6. The arrangement of claim 1 wherein the at least one building automation device object further includes a reference to a control program.

7. The arrangement of claim 1 wherein the at least one building automation device object further includes a reference to information regarding a response characteristic of the corresponding building automation device.

8. The arrangement of claim 1 wherein the reference to information regarding one or more building automation devices associated with the building space object comprises a reference to an operating value of the one or more building automation devices.

9. The arrangement of claim 8 wherein the reference to information regarding one or more building automation devices associated with the building space object comprises a reference to a measured value of the one or more building automation devices.

10. The arrangement of claim 1 wherein the at least one building space object further includes information identifying:
    a reference to location information regarding the building space object, the location information identify a location of the building space object with respect to other objects.

11. A method of generating a model of a building system comprising:
    a) selecting an object template for an element of a building system from an object template library, the object template library including building space object templates and building automation device objects;
    b) instantiating first information into at least one building space object using the selected object template if the selected object template is a building space object template, the first information associated with a space within a building with which the building system is associated;
    c) instantiating second information into at least one building automation device object using the selected object template if the selected object template is a building automation device template, the second information associated with a building automation device within the building, the second information including at least a reference to a building space object corresponding to a building space associated with the building automation device.

12. The method of claim 11 wherein the first information further includes information referencing at least one other building space object.

13. The method of claim 12, wherein the space associated with the building space object overlaps at least in part with another building space associated with the at least one other building space object.

14. The method of claim 11, wherein the first information includes a reference to a link to a graphic file, the graphic file including a graphical representation of the space.

15. The method of claim 11, wherein the first information includes a reference to information relating to at least one building automation device that is associated with the space.

16. The method of claim 11 wherein the second information includes a reference to a sensor value associated with the building automation device.

17. The method of claim 11 wherein the second information includes a reference to a control value associated with the building automation device.

18. The method of claim 11 wherein the second information includes a reference to a set point value.

19. The method of claim 11 wherein the second information includes a reference to a file containing descriptive information for the building automation device.

* * * * *